Sept. 17, 1940.    H. S. OGDEN    2,215,296
CONTROL SYSTEM
Filed Oct. 11, 1939
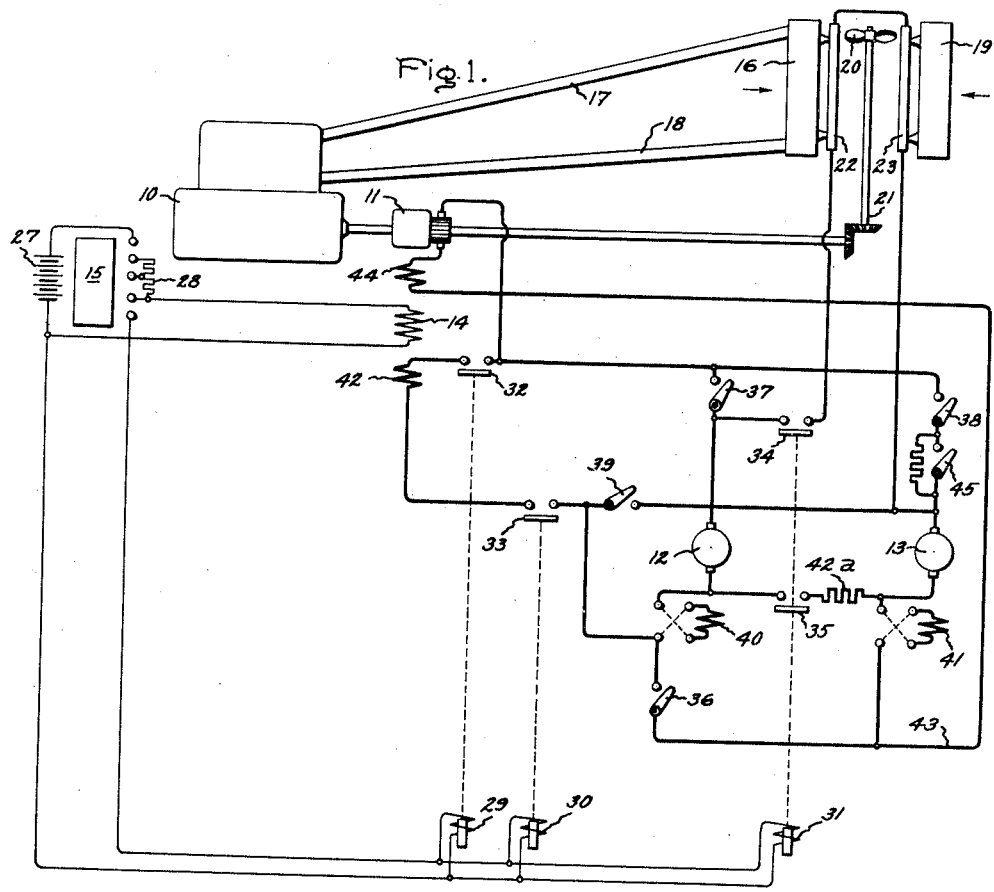
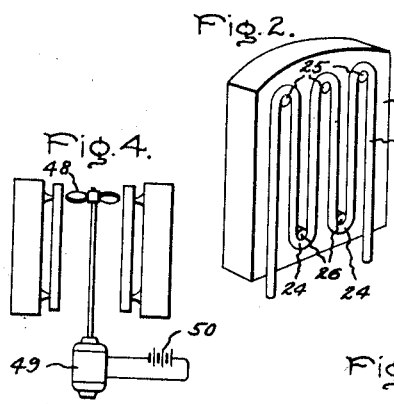
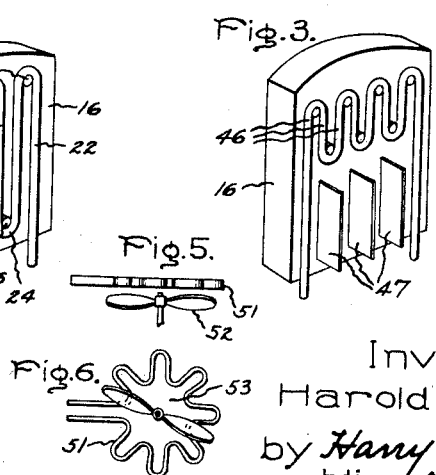
Inventor:
Harold S. Ogden,
by Harry E. Dunham
His Attorney.

Patented Sept. 17, 1940

2,215,296

UNITED STATES PATENT OFFICE 2,215,296

CONTROL SYSTEM

Harold S. Ogden, Erie, Pa., assignor to General Electric Company, a corporation of New York Application October 11, 1939, Serial No. 298,957

6 Claims. (Cl. 290—14)

My invention relates to control systems, more particularly to dynamic braking control systems for prime mover electric drives, and has for its object simple and reliable means for dissipating heat from the braking resistor.

In accordance with my invention, I provide a dynamic braking resistor which is mounted on the radiator or other cooling equipment for the prime mover so that the resistor is cooled when in operation simultaneously with the cooling of the prime mover.

For a more complete understanding of my invention, reference should be had to the accompanying drawing, Fig. 1 of which shows a prime mover electric propulsion system embodying my invention, Figs. 2 and 3 are perspective views showing the mounting of the dynamic braking resistor on the cooling radiator. Fig. 4 shows a modified form of my invention utilizing an electric driving motor for the fan; while Figs. 5 and 6 are elevation and plan views showing the resistor directly associated with the fan.

Referring to the drawing, I have shown my invention in one form as applied to a Diesel engine driven electric locomotive. It will be understood, however, that the invention is applicable also to other types of prime movers provided with cooling equipment, including steam turbines in which case the cooling equipment would be a steam condenser for the turbine.

As shown, the Diesel engine 10 is connected to drive a direct current generator 11 which during driving operation of the vehicle supplies power to the direct current driving motors 12 and 13. The generator shunt field winding 14 is controlled by a suitable manually-operated controller 15 which also controls the establishment of the motoring and dynamic braking connections.

The engine 10 is provided with a water cooling heat transfer means radiator 16 connected in a well-known manner to the cooling jacket of the engine through hose pipes 17 and 18. A second radiator 19 is also provided which is connected by hose pipes (not shown) in the water cooling circuit of the engine in parallel with the radiator 16. These radiators are suitably spaced apart and a fan 20 is mounted between them, this fan being driven through a direct mechanical connection 21 from the engine 10 and drawing air, which constitutes a heat transfer or heat dissipating means, from each side through the radiators as indicated by the arrows to the central space between them and then upward. It is contemplated that the radiators will be suitably enclosed at their sides and at the bottom to facilitate the circulation of cooling air through the radiators as previously described.

Two dynamic braking resistors 22 and 23 are mounted respectively on the radiators 16 and 19 on the sides of the radiators adjacent each other, i. e., the resistors 22 and 23 are in the space between the radiators in the air exit side of the radiators. As indicated in Fig. 2, the resistor is preferably made in the form of a ribbon of suitable electric resistance material and is formed into a plurality of loops 24 which are hung on suitable supporting electrical insulators 25 secured to the top of the radiator and further supported at their bottom by suitable insulators 26. It will be understood that these insulators support the resistor in spaced relation with the radiator so that it is electrically insulated from the radiator at all points.

With this mounting of the braking resistors on the radiators, it will be observed that the cooling air circulated through the radiators comes into contact with and immerses the resistors after it has passed through the radiators. This does not impair the cooling efficiency of the radiators and, on the other hand, the temperature rise of the air passing through the radiator is very small as compared with the permissible temperature rise of the air passing through the resistor. Consequently, the warm air coming from the radiators is still sufficiently cool to carry away the heat in the resistors. It will be understood that the radiators will operate at a temperature materially below the water boiling temperature whereas the resistor, depending upon the material from which it is made, may operate at a temperature of from 500 to 700 degrees centigrade when it is being used at its maximum current carrying capacity.

Moreover, during dynamic braking of the motors 12 and 13 through the resistor, the engine 10 is, of course, idling and, consequently, the radiators are not being used to capacity and, therefore, the temperature of the cooling air probably will be materially lower after passing through the radiators than it is during motoring operation of the equipment.

Preferably the resistor, as shown in Fig. 2, is spread out with its lengths some distance apart so as to offer no appreciable impediment to the passage of the cooling air through the radiator. Therefore, no appreciable decrease in the efficiency of the radiator results. Another advantage of this arrangement is that the resistor is mounted in a space which normally is used only for the passage of the cooling air from the radiators and, consequently, no additional space is required for the resistor.

The dynamic braking connections are established by turning the controller 15 so as to connect the shunt field winding 14 of the generator to an auxiliary supply source shown as a battery 27 through a resistance 28 and also to connect the operating coils 29, 30 and 31 to the battery for energization to close their switches 32, 33, 34 and 35. It will be understood that the switches 36, 37, 38 and 39 controlling the connection of the motors to the generator for motoring operation are open at this time, as shown. This connects the generator for energization of the motor series field windings 40 and 41 in series with each other, the circuit leading from the upper side of the generator through the switch 32, a stabilizing field winding 42 for the generator, the switch 33, the field winding 40, the switch 35, the stabilizing resistor 42a, the field winding 41, conductor 43, and series field winding 44 back to the generator. Also the motor armatures are connected in series with each other and to the resistors 22 and 23 which also are connected in series with each other. This circuit leads from the armature of the motor 12 through the switch 34 which is closed, the resistor 22, the resistor 23, the armature of the motor 13, and the switch 35 which is closed, back to the armature of the motor 12. Control of the dynamic braking is afforded by the resistance 28 which may be short circuited by the controller 15 as desired, to control the excitation of the field winding 14 and, therefore, the excitation of the motor fields and the dynamic braking.

For motoring operation, the field winding 14 is energized through the resistance 28 from the battery by means of the controller 15 or, if desired, a separate controller, the coils 29, 30 and 31 not being energized, and their switches, therefore, being open. The motoring switches 36, 37, 38, 39 and 45 are also controlled preferably by exciting coils energized by the controller 15 or a suitable separate controller to connect the motors in series or in parallel with each other to the generator.

In the operation of the cooling radiators with air forced horizontally through them, the air tends to have the greatest velocity over the shortest air path which with the arrangement shown in Fig. 1 is through the upper portion of the radiator. This has the effect of giving the greatest cooling action in the upper portion of the radiator. As shown in Fig. 3, I contemplate mounting the resistor back of an upper portion which may be the upper half of the radiator so as to take advantage of this increased rate of flow of the air. Also the convolutions 46 may be arranged more closely with respect to each other so as to obstruct the flow of air sufficiently to cause a greater amount of air to be passed through the lower portion of the radiator. This, of course, increases the efficiency of the radiator. Preferably shutters 47, which are manually or motor operated, are provided on the lower half of the radiator. During braking operation the shutters are closed to shut off the flow of air from the lower half of the radiator and thereby assure that all the air passes through the braking resistor.

As shown in Fig. 4 the fan 48 may be driven by an electric motor 49 which is energized from a suitable supply source such as a battery 50. This arrangement has an advantage over the mechanical drive 21 from the engine of Fig. 1 that the fan is operated at full speed for maximum cooling effect when the engine is idling.

Figs. 5 and 6 show an arrangement of the resistor 51 directly in front of the fan 52, or more specifically above the fan. In this case the resistor lengths pass back and forth axially of the fan area. The resistor lengths do not extend over a central circular area 53 where the air velocity is lowest.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

What I claim as new and desire to secure by Letters Patent of the United States, is:

1. The combination in a prime mover electric drive system of heat transfer means for said prime mover, means for circulating a heat transfer medium through said heat transfer means, and a dynamic braking resistor mounted in position to be immersed in the heated heat transfer medium leaving said heat transfer means.

2. The combination in a prime mover electric drive system of a cooling radiator for the prime mover, means for circulating cooling air through said radiator, and a dynamic braking resistor mounted on said radiator in position to be cooled by the heated cooling air leaving said radiator.

3. The combination in a prime mover electric drive system of a water heat transfer radiator for the prime mover, means for circulating a heat transfer medium through said radiator, a generator driven by said prime mover, a driving motor energized by said generator, a dynamic braking resistor for said motor mounted in position to be immersed in the heat transfer medium leaving said radiator, and means for controlling the electrical connections between said motor and said generator and between said motor and said braking resistor thereby to connect said resistor to said motor for dynamic braking of said motor, said resistor being constructed to be heated to a temperature above the boiling point of water for efficient cooling by the heated air leaving said radiator.

4. The combination in a prime mover electric drive system of a water cooling radiator for the prime mover, means for circulating cooling air through said radiator, a generator driven by said prime mover, a driving motor energized by said generator, a dynamic braking resistor for said motor mounted in position to be immersed in the cooling air leaving said radiator, and means for controlling the electrical connections between said motor and said generator and between said motor and said braking resistor thereby to connect said resistor to said motor for dynamic braking of said motor, said resistor being constructed to be heated to a temperature above the cooling point of water for efficient cooling by the heated air leaving said radiator.

5. In a vehicle drive system, a traction motor, a generator provided with a field winding for supplying current to said motor, a prime mover for driving said generator, said prime mover being provided with heat transfer means, means for circulating a heat transfer medium through said heat transfer means, a dynamic braking resistor for said motor, means supporting said resistor in position to be immersed in said heat transfer medium, connections for connecting said resistor to said motor for dynamic braking of said motor, and means for controlling said field winding to control said dynamic braking operation.

6. In a vehicle drive system, a direct current traction motor, a generator provided with a field winding for supplying current to said motor, a prime mover for driving said generator, said prime mover being provided with a cooling radiator, means for circulating cooling air through said radiator, a dynamic braking resistor for said motor, means supporting said resistor on said radiator in insulated relation therewith and on the cooling air exit side of said radiator, connections for connecting said resistor to said motor for dynamic braking of said motor, and means for controlling said field winding to control said dynamic braking operation.

HAROLD S. OGDEN.